US007133875B1

(12) United States Patent
Chatterjee et al.

(10) Patent No.: US 7,133,875 B1
(45) Date of Patent: Nov. 7, 2006

(54) METHOD AND APPARATUS FOR REDEFINING A GROUP OF RELATED OBJECTS IN A RELATIONAL DATABASE SYSTEM

(75) Inventors: Ramkrishna Chatterjee, Nashua, NH (US); Ramesh Vasudevan, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 214 days.

(21) Appl. No.: 10/121,369

(22) Filed: Apr. 12, 2002

(51) Int. Cl.
*G06F 17/30* (2006.01)

(52) U.S. Cl. ...................... 707/102; 707/203
(58) Field of Classification Search ............ 707/1, 707/2, 3, 4, 5, 6, 7, 8, 9, 10, 101, 102, 103, 707/104, 200, 201, 202, 203, 100, 104.1; 713/201
See application file for complete search history.

(56) References Cited

U.S. PATENT DOCUMENTS

| | | | | |
|---|---|---|---|---|
| 5,440,730 A | * | 8/1995 | Elmasri et al. ............. | 707/203 |
| 5,751,949 A | * | 5/1998 | Thomson et al. ........... | 713/201 |
| 5,950,210 A | * | 9/1999 | Nelson ....................... | 707/203 |
| 6,058,391 A | * | 5/2000 | Gardner ...................... | 707/4 |
| 6,115,704 A | * | 9/2000 | Olson et al. ................ | 707/3 |
| 6,233,573 B1 | * | 5/2001 | Bair et al. .................. | 707/3 |
| 6,275,824 B1 | * | 8/2001 | O'Flaherty et al. .......... | 707/9 |
| 6,366,917 B1 | * | 4/2002 | St. John Herbert, III ... | 707/100 |
| 6,631,386 B1 | * | 10/2003 | Arun et al. ................. | 707/203 |

* cited by examiner

*Primary Examiner*—Jeffrey Gaffin
*Assistant Examiner*—Yicun Wu
(74) *Attorney, Agent, or Firm*—Gordon E. Nelson

(57) ABSTRACT

Techniques for redefining a group of related objects in a relational database system by redefining a table belonging to the group of related objects and then redefining the other related objects in the group so that they are in conformity with the redefined table. The techniques permit DDL to be used to redefine a view and are also useful in a versioned relational database system for redefining the table from which the versions are generated. In the versioned relational database system which employs the technique, the versions are generated from a view. To redefine the view, the technique is employed as follows: the view's definition in the relational database system is used to make a base table that has a form which is substantially similar to that of the view. DDL is then applied to the base table to redefine it. The redefined base table definition and the definitions of the objects belonging to the versioned relational database system are then used to redefine the definitions of the objects belonging to the versioned relational database system so that they are in conformity with the base table as redefined by the DDL.

16 Claims, 12 Drawing Sheets

Prior Art  Fig. 1

| name 405 | salary 407 | address 409 | ver no 503 | child vers 505 | del? 507 | lock? 509 |
|---|---|---|---|---|---|---|
| Anderson | | | 0 | 1 | N | |
| Finch | | | 0 | | N | |
| Imhof | | | 0 | 1,2 | N | |
| Johnson | | | 0 | | N | |
| Meyers | | | 0 | | N | |
| Nelson | | | 0 | 1,2,3 | N | |
| Anderson | | | 1 | | Y | |
| Imhof | | | 1 | | Y | |
| Nelson | | | 1 | | Y | |
| Imhof | | | 2 | | Y | |
| Nelson | | | 2 | | Y | |
| Nelson | | | 3 | | Y | |

511(0): rows with ver no 0
511(1): Anderson, Imhof, Nelson with ver no 1
511(2): Imhof, Nelson with ver no 2
511(3): Nelson with ver no 3 emp_table_LT 501 primary key: name, ver no

502

| name 405 | salary 407 | address 409 |
|---|---|---|
| Finch | | |
| Johnson | | |
| Meyers | | | pessimistic result 513 (403(1))

| name 405 | salary 407 | address 409 |
|---|---|---|
| Anderson | | |
| Finch | | |
| Johnson | | |
| Meyers | | | current_level result 521 (403(2))

| name 405 | salary 407 | |
|---|---|---|
| Anderson | | |
| Finch | | |
| Imhof | | |
| Johnson | | |
| Meyers | | | optimistic result 523 (403(3))

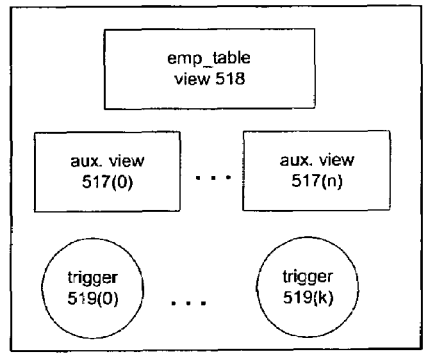

built-in objects 515 related to table 501

Fig. 5

```
EXECUTE DBMS_WM.EnableVersioning('emp_table');   603

--Produces versioned table 'emp_table_LT'

EXECUTE DBMS_WM.CreateWorkspace('pessimistic');   605
EXECUTE DBMS_WM.CreateWorkspace('current_level');
EXECUTE DBMS_WM.CreateWorkspace('optimistic');

EXECUTE DBMS_WM.GoToWorkspace('pessimistic');   607

--DML operation to delete employee rows

DELETE FROM 'emp_table' WHERE                     608
      name IN ('Anderson','Imhof', 'Johnson');

--Do DDL operation to add a column for email addresses to
--    emp_table

EXECUTE DBMS_WM.BeginDDL('emp_table')             609

--Creates the skeleton table 'emp_table_LTS'

--The DDL operation                               611

ALTER TABLE ('emp_table_LTS')
            ADD COLUMN (email_address varchar2 (100));
                                                  613
--'emp_table_LTS' now has a new column 'email_address'

EXECUTE DBMS_WM.CommitDDL('emp_table')

--Applies the changes made in the skeleton table to
--    emp_table_lt and the objects associated with it

```
Trigger T_BU
before update on  table T
 for each row
 Begin
        if  ( new(T.col1) - old(T.col1) >  100 ) then
             execute  proc(new(T.col1));
                new(T.col1) :=  old(T.col1) +100; -- the maximum
                                                 allowed  increment
        end if;
   End;

801

Trigger <view_name>_INSTEADOF_UPDATE
     INSTEAD OF UPDATE on <view_name>
     FOR EACH ROW
     EXECUTE T_BU_Wrapper
          (new(<view_name>.col1,old(<view_name.col1>);
          . . . versioning logic . . .
          /* Implement all constraint checks */
          /* execute all after update trigger wrapper
               procedures */
     END;

803 procedure T_BU_Wrapper(owm$new$col1  IN   OUT   integer,
                              owm$old$col1 IN   integer)
      is
      Begin
           if ( owm$new$col1 - owm$old$col1 > 100 ) then
              execute proc(owm$new$col1);
                 owm$new$col1 :=  owm$old$col1 + 100;  -- the
                                       maximum allowed  increment
      End;

```
1.   DROP VIEW emp_table;
2.   DROP VIEW emp_table_conf;   /* Conflicts view */
3.   DROP VIEW emp_table_lock;   /* Locks view */
4.   DROP VIEW emp_table_diff;   /* Differences view */
5.   DROP VIEW emp_table_mw;     /* Multi-Workspace view */
6.   ALTER TABLE emp_table_lt ADD COLUMN                905
                 (email_address varchar2 (100));
```
903

```
7.  Procedure emp_table_bu_wrapper (
        owm$new$name IN OUT varchar2,
        owm$old$name IN varchar2,
        owm$new$salary IN OUT number,
        owm$old$salary IN number,
        owm$new$address IN OUT varchar2,
        owm$old$address IN varchar2)
    IS
    BEGIN
        If (owm$new$salary > 1000) then
            Execute proc(owm$new$salary);
        End If;
    END;
```
1003

```
Procedure emp_table_bu_wrapper (
        owm$new$name IN OUT varchar2,
        owm$old$name IN varchar2,
        owm$new$salary IN OUT number,
        owm$old$salary IN number,
        owm$new$address IN OUT varchar2,
        owm$old$address IN varchar2,
        owm$new$email_address IN OUT varchar2,
        owm$old$ email_address IN varchar2)
IS
BEGIN
    If (owm$new$salary > 1000) then
        Execute proc(owm$new$salary);
    End If;
END;
```
1005
1007

```
8.    CREATE VIEW emp_table AS
SELECT name, salary, address, email_address
FROM    emp_table_lt
WHERE   <where_clause_for_versioning>
```
⎫ 1103

```
9.    CREATE VIEW emp_table_conf AS
SELECT name, salary, address, email_address,
       <other_conflict_related_metadata_columns>
FROM     emp_table_lt, <version_metadata_tables>
WHERE   <where_clause_for_conflicts>
```
⎫ 1107

```
10.   CREATE VIEW emp_table_diff AS
SELECT name, salary, address, email_address,
       <other_differences_related_metadata_columns>
FROM     emp_table_lt, <version_metadata_tables>
WHERE   <where_clause_for_differences>
```
⎫ 1109

⎫ 1105

```
11.   CREATE VIEW emp_table_lock AS
SELECT name, salary, address, email_address,
         <other_lock_related_metadata_columns>
FROM     emp_table_lt, <version_metadata_tables>
WHERE   <where_clause_for_locks>
```
⎫ 1111

```
12.   CREATE VIEW emp_table_mw AS
SELECT name, salary, address, email_address,
  <other_multi_workspace_related_metadata_columns>
FROM     emp_table_lt, <version_metadata_tables>
WHERE   <where_clause_for_multi_workspaces>
```
⎫ 1113

```
13.  CREATE TRIGGER emp_table_INSTEADOF_UPDATE   1205
         INSTEAD OF UPDATE on emp_table    1207
         FOR EACH ROW
         BEGIN
             /* Execute all before update trigger wrapper
                 procedures */
             …..versioning logic……
             /* Implement all constraint checks */
             /* Execute all after update trigger wrapper
                procedures */
         END;

14.  CREATE TRIGGER emp_table_INSTEADOF_INSERT
         INSTEAD OF INSERT on emp_table
         FOR EACH ROW
         BEGIN
             /* Execute all before insert trigger wrapper
                 procedures */
             …..versioning logic……
             /* Implement all constraint checks */
             /* Execute all after insert trigger wrapper
                 procedures */
         END;

15.  CREATE TRIGGER emp_table_INSTEADOF_DELETE
         INSTEAD OF DELETE on emp_table
         FOR EACH ROW
         BEGIN
             /* Execute all before delete trigger wrapper
                 procedures */
             …..versioning logic……
             /* Implement all constraint checks */
             /* Execute all after delete trigger wrapper
                 procedures */
         END;

METHOD AND APPARATUS FOR REDEFINING A GROUP OF RELATED OBJECTS IN A RELATIONAL DATABASE SYSTEM

BACKGROUND OF THE INVENTION

1. Field of the Invention

The invention relates generally to relational database systems and more specifically to techniques for simplifying the redefinition of a group of related objects in the database system.

2. Description of Related Art

Database systems are systems which store data and permit users of the systems to access items of the data by means of queries which describe the data in terms of the structure given the data by the database system. A common kind of database system is a relational database system. In such systems, the data is organized as a set of tables. A relational database table has a fixed number of columns and a variable number of rows. Each row has a field corresponding to each column, and the field contains a value. Queries on relational databases specify the data to be accessed in terms of the table or tables that contain it, columns in the table, and values of fields in some of the specified columns. For example, a simple table employees might look like this:

| emp_no | emp_name |
|--------|----------|
| 001    | Jones    |
| 002    | Smith    |
| 003    | Andrews  |
| 004    | Todd     |

The table has two columns, named emp_no, whose fields contain employee numbers, and emp_name, whose fields contain employee names, and four rows. A query that returned the name of the employee with the employee number "002" would look like this in the standard SQL language used with relational database systems:

SELECT emp_name FROM employees WHERE emp_no=002;

When the database system executes the query, it finds the row in the table employees whose field in the column emp_no has the value "002" and returns the value of the field in the row belonging to the column emp_name, or "Smith".

FIG. 1 shows the portions of a typical relational database system 101 that are relevant to the present discussion. The main components of system 101 are a processor, a memory 103 which contains programs 105 being executed by the processor and data 113 involved in the program executions, and persistent storage 123 for the database system's tables and other objects. Processor 121 may further receive inputs from input devices such as a keyboard and/or pointing device and produce outputs to a display device such as a CRT, as shown at 122, and may also receive inputs from and provide outputs to one or more networks, containing other processors, as shown at 124.

When system 101 is operating, programs 105 in memory 103 include an operating system 107, a relational database system program 109, and application programs 111 that employ the services provided both by operating system 107 and database program 109. Correspondingly, data 113 in memory 103 includes data for the application programs, data for the operating system, and data for the database system. Operation typically involves an application program 111, which provides a query to relational database program 109. Database program 109 executes the query on the tables in persistent storage 123 and provides the result to application program 111. Both RDB program 109 and application program 111 use the services provided by operating system 107, and execution of the application program or the database RDB program may involve inputs from and outputs to I/O devices and the network.

Continuing in more detail, persistent storage 123 contains two classes of objects: DB system objects, which are objects, including tables, that database system 101 uses to manage and operate the database system, and user objects 129, which contain tables and other objects defined by users of the database system. In the present context, the only system objects which are important are those belonging to data dictionary 127, which contains definitions of all of the objects in the database system.

User tables include base tables 131, views 118, and materialized views 141. Base tables 131 are the tables that are the actual sources of the data returned by a query. Views are tables which do not exist in their own rights in persistent storage 123, but are instead created using data from other tables. Data dictionary 227 contains definitions of base tables, of tables defined in terms of the base tables, and definitions of other objects that are defined for the tables. These other objects include indexes, which speed up access to the data contained in a column of a table, triggers, which define actions to be taken upon occurrence of events concerning the table, and constraints, i.e. rules about the values that must be in the fields.

A view is defined in the data dictionary by a query on other tables. The other tables may also be views, but the data must ultimately come from base tables. View 118 contains four columns and three rows. The data in columns 1 and 2 comes from columns 1 and 2 of base table 131(*a*); the data in columns 3 and 4 comes from columns 3 and 4 of base table 131(*b*); the query that defines view 118 has selected the fields of columns 1 and 2 of rows 3–5 of table 131(*a*) and the fields of columns 3 and 4 of rows 2, 6, and 8 of table 131(*b*). When relational database system 101 executes a query on a view 118, it must first make the view, which requires running the query which defines the view; consequently, if the view is frequently queried, the view may be made into a materialized view 141, which is a copy of the view which has been stored in persistent storage 123. Data dictionary 127 keeps track of the fact that there is a materialized view 141 corresponding to view 118, and database system 101 redirects a query of view 118 to materialized view 141.

The standard SQL language used to describe operations on relational databases has two major subdivisions: the data manipulation language, or DML, which is used to read and modify rows and individual data fields in the database's tables, and the data definition language, or DDL, which is used to define and redefine the tables themselves. The query discussed above is an example of a DML statement; a DDL statement that redefines the employees table by adding a column comments for comments looks like this:

ALTER TABLE employees ADD (comments VARCHAR2(100));

For details on the standard SQL language, see Oracle8i SQL Reference, Release 3 (8.1.7), Part Number A85397-01, available in March, 2002 from the Oracle Corporation website http://otn.oracle.com. While DML statements that write to a view or materialized view write to the base tables underlying the view or materialized view, DDL statements cannot be used with a view or a materialized view. Thus, if one wants to redefine a view or a materialized view, one must use DDL to add the column to a base table which underlies the view or materialized view is based and then to redefine any other objects in the database system that are affected by the change in the base table. Of course, the DDL can be used this way only if one understands how the view is related to the other objects.

When databases were relatively simple and the people who redefined views were the same people who had set up the objects that needed redefining if the view was redefined, the need to understand the base tables and other objects related to a view in order to redefine the view was not a serious problem. Now it has become one. The relationships between views and the underlying base tables have become more complex and in many cases, the people who are making and using the views are not the people who originally designed the database.

One example of the increasingly complex relationships between views and the underlying tables and between the users of the database system and the data is data mining. Data mining attempts to extract new kinds of information from old databases, for example, marketing information from a telephone company's billing database. Since the database was originally set up for billing purposes, not marketing research purposes, the most efficient way to use it for marketing research purposes is to define a set of views which extract the marketing information from the billing database. These views are defined by the data miners, who are generally not the people who designed the original billing database. Moreover, data miners are continually redefining the views they use. As things presently stand, they cannot do so without intimate knowledge of the underlying billing database.

Another example is versioned databases. A versioned database is one in which different versions of the database exist simultaneously. There is a view corresponding to each version of the database, and what users of the versioned database see is these views, rather than the underlying base tables. For details on a commercially-available versioned database, see Oracle9i Application Developer's Guide—Workspace Manager, Release 1 (9.0.1), Part Number A88806-01, available in March, 2002 at the above-mentioned Web site. Versioned databases are typically used in research and development situations: when a new line of research which will affect an existing database begins, a new version of the database is associated with the line of work, and the results of the research are incorporated into the new version of the database. When the work is to the point where it can be incorporated into the existing database, the new version is merged into the existing database. Again, the way in which versioned databases are used often makes redefinition of the views necessary.

To the extent that the prior art has dealt at all with the problem of making changes in the definitions of views that are reflected in the database objects that underlie and are related to the views, it has done so by means of system-specific procedural interfaces. In the context of relational database systems, the use of procedural interfaces to redefine views has significant costs.

- In relational database systems generally, objects are defined and redefined using DDL, and most people who work with relational database systems know and are comfortable with DDL. That is not the case with the procedural interfaces.
- Relational database systems come with powerful and efficient tools for writing and processing DDL definitions of database objects. These tools are not available for the procedural interfaces.

What is needed is a technique that permits a user of a relational database system to use DDL to redefine a view without having to understand and redefine the objects that are related to the view.

SUMMARY OF THE INVENTION

The technique which solves the foregoing problem is a general technique for redefining a given table in a relational database system. The given table belongs to a group of related objects. The related objects have definitions in the relational database system and the technique involves using the given table's definition to make a base table and a definition therefor, with the base table having substantially the same form as the given table. The base table and its definition are then redefined, and the redefined base table definition and the definitions of the related objects are used to redefine the definitions of the related objects as required to bring the definitions of the related objects into conformity with the redefined base table.

In further aspects of the invention, the base table and its definition are redefined by applying a DDL statement to the base table. The technique is particularly advantageous when the given table is a view.

A particular application of the technique is to redefine a versioned relational database system. In a versioned relational database system, a group of objects contains information needed to maintain versions of a database; one of the objects is a view that is used to generate the various versions. The technique is used to redefine the view. A skeleton table, which is a base table, is defined using the view's definition. The skeleton table has a form which is substantially similar to that of the view. An SQL parser then applies a DDL statement to the skeleton table to produce a redefined definition of the skeleton table. The redefined definition and the definitions of the group of objects are then used to redefine the definitions of the group of objects as required to bring the objects in the group of objects into conformity with the skeleton table as redefined by the DDL statement.

Other objects and advantages will be apparent to those skilled in the arts to which the invention pertains upon perusal of the following Detailed Description and drawing, wherein:

BRIEF DESCRIPTION OF THE DRAWING

FIG. 5 shows details of a table in the versioned relational database system;

FIG. 6 shows commands used to manipulate the table of FIG. 5;

FIG. 8 shows how triggers can be transformed using wrappers;

FIG. 9 shows a first part of the PL/SQL instructions generated by transformer 317 for the example of FIG. 6;

FIG. 10 shows a second part of the PL/SQL instructions generated by transformer 317 for the example of FIG. 6;

FIG. 11 shows a third part of the PL/SQL instructions generated by transformer 317 for the example of FIG. 6; and FIG. 12 shows a fourth part of the PL/SQL instructions generated by transformer 317 for the example of FIG. 6.

Figure 1:
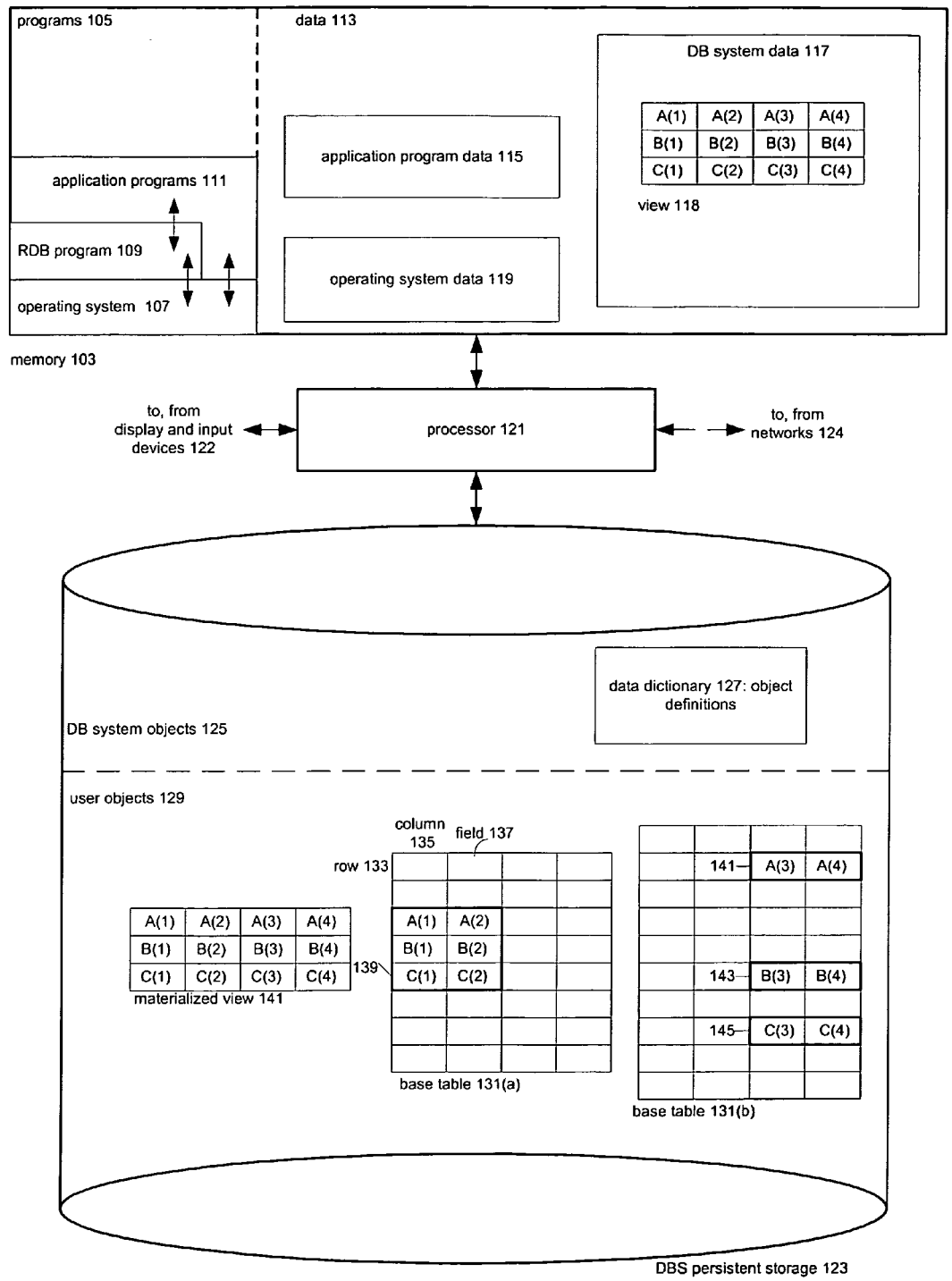
FIG. 1 is an overview of a prior-art relational database system.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following detailed description will begin with an overview of the technique for using DDL to redefine a view such that the redefinition is reflected in the underlying base tables for the view and will then disclose in detail how the technique is used in a versioned database.

Figure 2:
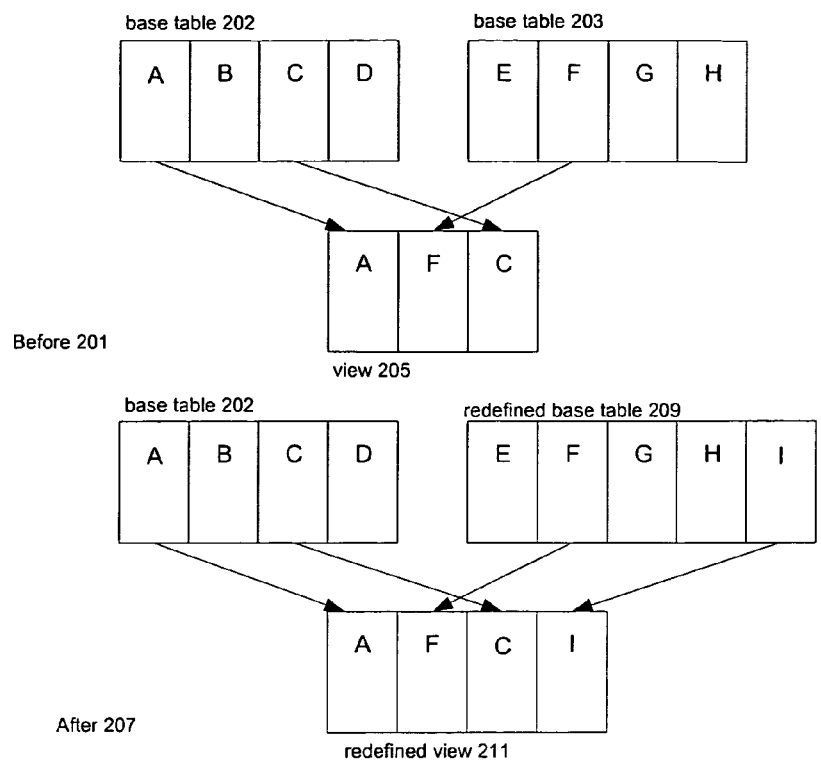
FIG. 2 shows an example redefinition of a view that is reflected in a base table.
Figure 3:
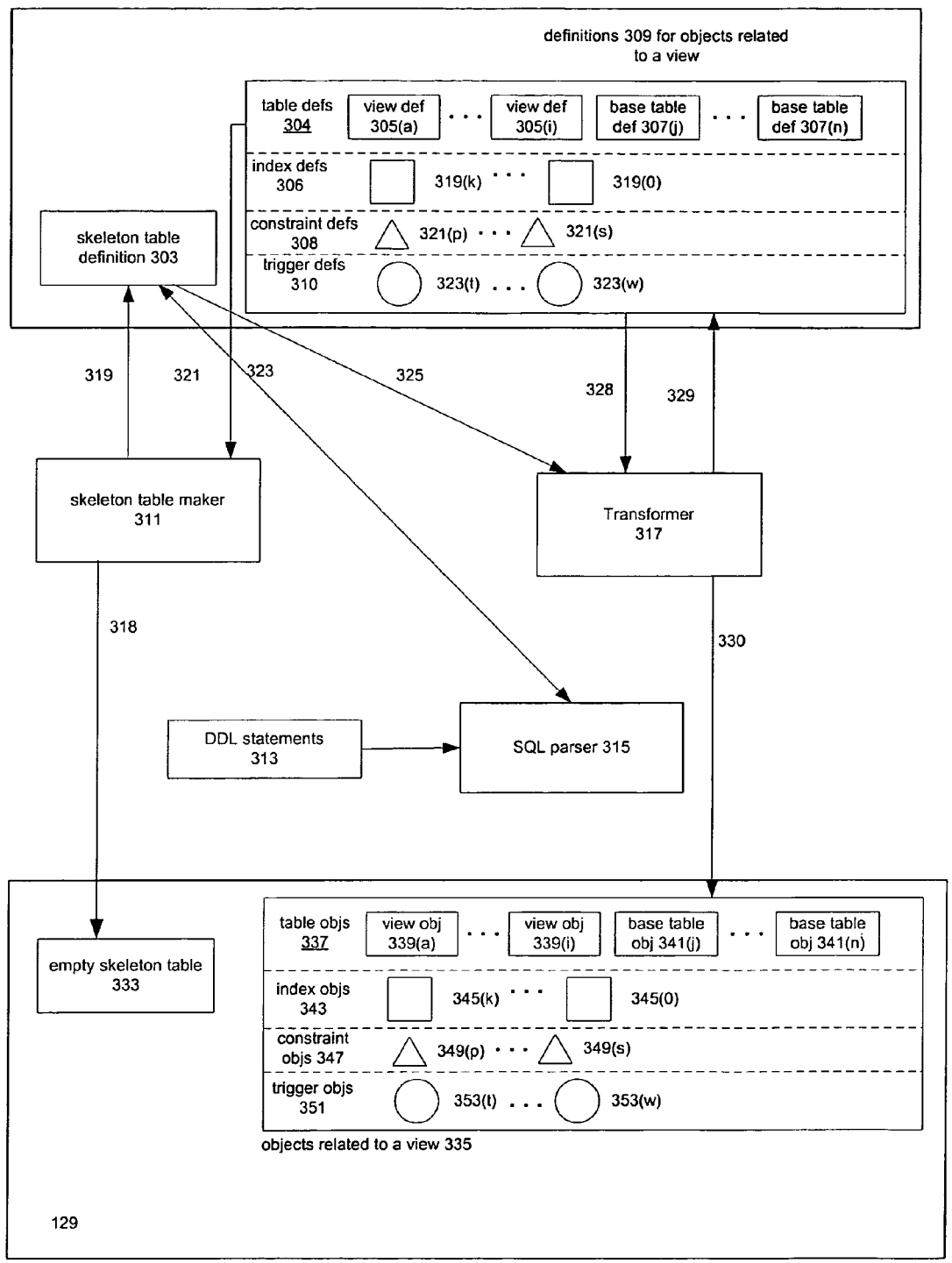
FIG. 3 is a block diagram of a system for reflecting a redefinition of a view in a base table.

Overview of the Technique: FIGS. 2 and 3

FIG. 2 shows some base tables and a view made from the base tables before and after modification of the base tables and view using the technique. As shown at before 201, base table 202 has four columns, A, B, C, and D, and base table 203 also has four columns, E, F, G, and H. Base tables 202 and 203 are the underlying tables for view 205, which has three columns, A, F, and C, A and C being from table 202 and F being from table 203.

As shown at after 207, a user of view 205 now wishes to add a new column I to view 205 to produce redefined view 211. This column does not, however, exist in either base table 202 or base table 203. In the prior art, the user cannot use DDL to redefine view 205 to include column I, but must instead either use a non-DDL procedural interface to redefine view 205 or use DDL to redefine base table 203 to produce base table 209 with the new column I and then to redefine view 205 to produce redefined view 211. The technique disclosed herein permits the user to use DDL to redefine view 205 to produce view 211, and the technique thereupon automatically redefines table 203 and view 205 as required for table 209 and view 211.

FIG. 3 shows how the technique is implemented in a database system such as database system 101 of FIG. 1. The object definitions 309 involved in the technique are contained in data dictionary 127, the objects themselves are contained in user objects 129, and skeleton table maker 311, SQL parser 315, and transformer 317 are components of RDB program 109. DDL statements 313 are input to processor 121 by the user who is employing the technique.

At the stage shown in before 201, data dictionary 127 includes object definitions 309 for objects related to view 205; included in these object definitions are table definitions 304 for base tables 307 and views 305, including any materialized views. Further object definitions may include index definitions 306, which define indexes 319 that speed access to the tables defined by definitions 309, constraint definitions 308, which define constraints 321 on tables defined in definitions 309, and trigger definitions 310, which define triggers 323, i.e., actions to be taken when certain conditions arise with regard to the tables defined in definitions 309. User objects 129 contain objects 335 corresponding to the definitions of 309.

When the user begins using the technique, he or she inputs a command to processor 121 which specifies a table in objects 335 which is being redefined. Skeleton table maker 311 responds to the command by producing skeleton table definition 303 in data dictionary 127 and empty skeleton table 333 in user objects 129. Skeleton table 333 is an empty base table that has the same form as the table in objects 335 that the user wishes to redefine, in this case, view 205. Skeleton table definition 303 and skeleton table 333 are produced using information in table definitions 309 for objects related to view 205 What is meant by form in this context is that the skeleton table has the same columns, triggers, constraints, and indexes as the table that is to be redefined. Depending on the application, the table used to produce skeleton table 333 may be a base table or a view.

Because skeleton table 333 is a base table and not a view, DDL statements can be used to redefine skeleton table 333 thereby change skeleton table definition 303. DDL statements 313 are input by the user to processor 121 and are received by parser 315, which parses the DDL statements and applies them to empty skeleton table 333 and skeleton table definition 303 and in the usual fashion; in the example of FIG. 2, the DDL statements add column I to skeleton table 333 and make the corresponding change in skeleton table definition 303. Since skeleton table 333 has the same form as the table used to produce skeleton table 333, the DDL statements need only redefine skeleton table 333 in the same way as the user wishes to redefine the table skeleton table 333 was produced from.

The next step is to bring the objects 335 and object definitions 309 for the objects related to the table whose definition was used to produce skeleton table 333 into conformity with the changes made in skeleton table 333. That is done by transformer 317, which uses the information in skeleton table definition 303 and definitions 309 to redefine definitions 309 such that the table which was the source of skeleton table 333 has been redefined in the same fashion as the skeleton table was and all of the definitions of objects related to that table have been redefined as required to conform to the new definition of that table. Then, of course, objects 335 are modified as required by the redefined definitions 309.

Figure 4:
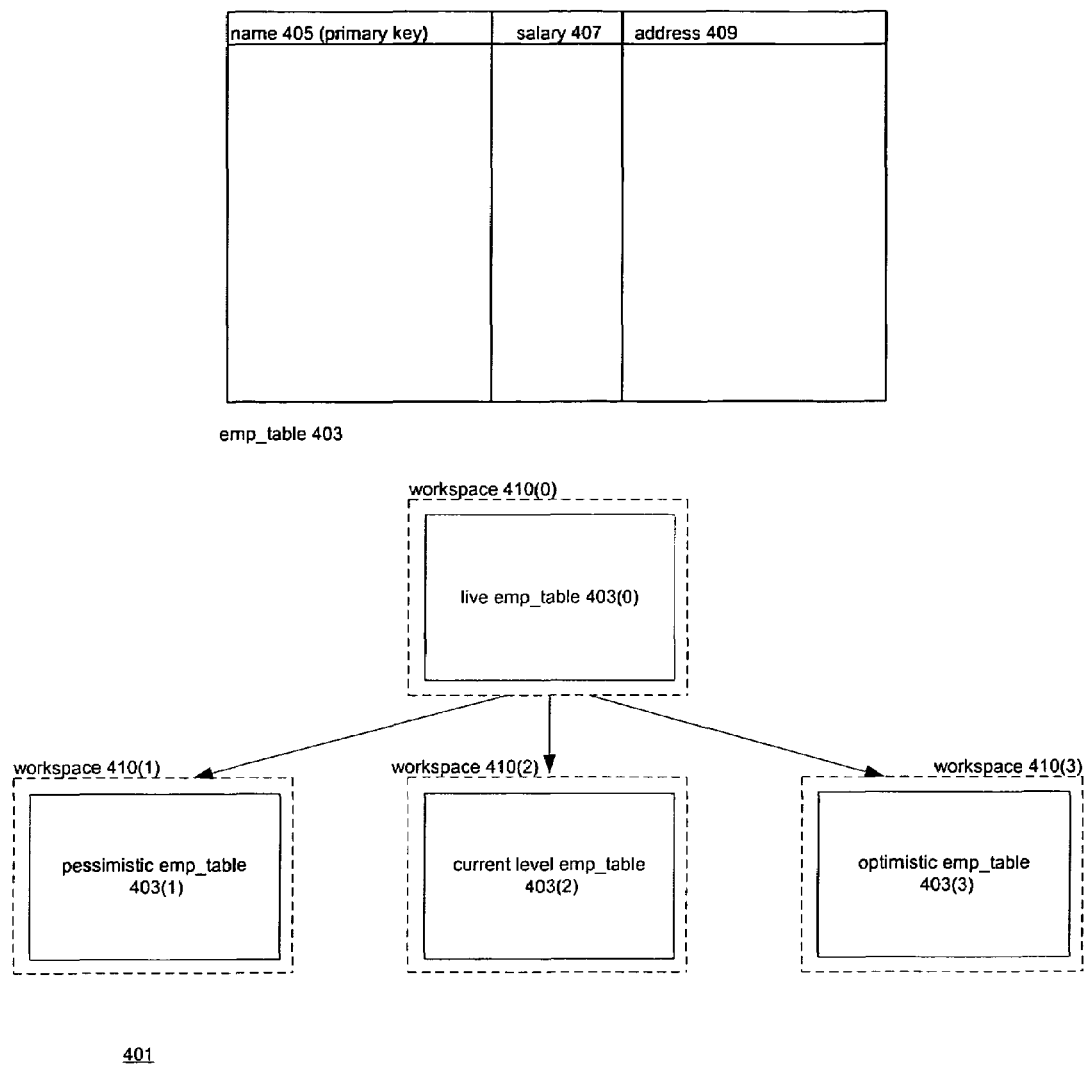
FIG. 4 is an overview of a versioned relational database system to which the system of FIG. 3 may be applied.

A Versioned Relational Database System in which a Preferred Embodiment of the Technique May be Employed: FIGS. 4 and 5

A preferred embodiment of the technique may be employed in the Oracle Workspace Manager, a versioned relational database system (VRDBS), implemented in the Oracle 9i database system manufactured by Oracle Corporation and described in detail in the above-mentioned *Oracle 9i Application Developer's Guide—Workspace Manager*, Release 1 (9.0.1). FIG. 4 presents an overview of a versioned relational database system (VRDBS) 401 and FIG. 5 presents relevant details of its implementation in the Oracle Workspace Manager. Shown in FIG. 4 is an example table, emp_table 403, which is a table of employee information. There is a row for each employee. The table has three columns: name 405, whose fields contain the employees' names, salary 407, whose fields contain the employees' salaries, and address 409, whose fields contain the employees' addresses. The values of the name fields are the primary keys for the table and must consequently obey a uniqueness constraint within the table.

In a versioned relational database, different versions of emp_table 403 may be maintained simultaneously, with independent access to each of the versions. Each version is termed a workspace. Different versions of emp_table 403 can be created by modifying the table in different workspaces. One application of a versioned relational database is doing "what if" exercises with different versions of the data in the database system. In FIG. 4, such an exercise is being performed. A user of the versioned relational database has made three new workspaces 410(1..3) containing versions of emp_table 403. The version from which the new versions were made is in live workspace 410(0). The version in each workspace begins as a copy of a version in an already existing workspace. The user then modifies the new version in the workspaces as required. In the example, the version in live workspace 410(0) is a table of the current employees. One of the workspaces, 410(1), contains a pessimistic table 403(1) for a business scenario in which times are hard and employees must be reduced to a minimum; one 410(2), a current level table 403(2), for a scenario in which the present business conditions continue and the number of employees needs a smaller reduction, and one 410(3), an optimistic table 403(3), for a scenario in which business improves and only a minimal reduction need be considered.

As shown at 401, the workspaces 410(0..3) containing versions of emp_table 403 form a hierarchy. At the top of the hierarchy is workspace 410(0) for live emp_table 403(0), which contains the version of emp_table 403 which is currently available to users other than the ones who are making the versions. At the next level are three workspaces 410(1..3) for table versions 403(1..3). To make an additional workspace based on any workspace in the hierarchy, one simply goes to that workspace and makes the new workspace. The additional workspace is a child of the workspace in which it was made. Changes made in one of the workspaces may be propagated up or down the hierarchy to other workspaces. Thus, if times are hard, workspace 410(1) of pessimistic table 403(1) may be merged with workspace 410(0) of live emp_table 403(0). After the merger, live emp_table 403(0) will have the modifications made in pessimistic table 403(1).

In the Oracle Workspace Manager, the table versions in the workspaces are implemented by displaying the results of queries on tables. The tables may be views or base tables. The tables contain not only the information that is of interest to the users of the versioned database, but additional columns for version information which the database system uses to generate the query results corresponding to each of the versions. FIG. 5 shows a redefinition 501 of emp table 403, emp_table_LT 501, which contains version info columns 502 and additional rows of information 511(1..3). The information in the version information columns and in the additional rows permits the generation of results corresponding to tables 403(0..3) from table 501, as shown at 513, 521, and 523.

Continuing with version information columns 502, there are four such columns:

version number 503: the value in a row's field in this column indicates the version that the row with its present contents was created in.

child version numbers 505: this field contains a list of numbers of versions lower in the hierarchy in which this row has been modified.

deleted flag 507: this field indicates whether the row has been deleted in the version indicated in field 503; and lock flag 509: this field indicates whether the row is currently locked.

Changes are made in table 501 by users working on various versions of the table. Changes may include modifications of values in fields of the table and addition or deletion of rows.

When a row is changed in a version of the table so that it is no longer identical with a row higher in the hierarchy, the new version of the row is added to table 501, with version number 503 set to indicate which version the added row was changed in. Child version field 505 of the parent row the changed row was formerly identical with is changed to indicate that the parent row is no longer contained in the child version. When a row that is present at a higher level in the hierarchy is included in a lower level of the hierarchy, child versions 505 is updated in the higher-level row to indicate the fact that the row is included in the lower-level version.

In FIG. 5, live emp_table 403(0) has rows for six employees; these rows appear at 511(0) in emp_table_LT 501. Versions 403(1–3) differ from version 403(0) in that in the query results for each version, a greater or lesser number of rows are deleted from version 403(0). In pessimistic version 403(1), rows for three employees are deleted; in current level version 403(2), rows for two employees are deleted; in optimistic version 403(3), only 1 row is deleted. Delete flag 507 is used to indicate whether a row is deleted in a given version. Thus, as shown in rows 511(1), pessimistic version 403(1) is specified in table 501 by including a row for each employee whose row is to be deleted. Version number field 503 indicates that these rows have been changed in version 1 and delete flag 507 indicates that the rows have been deleted in that version. Current level version 403(2) is specified in the same way at 511(2), and optimistic version 403(3) is specified at 511(3).

In a preferred embodiment, the views for the workspaces are generated dynamically from a view which appears in built-in objects 515 as emp table view 518. This view is simply a view of emp_table_LT 501 which does not include the columns that contain version information 502. For a given version v, the view (v) for the version v shows the set of rows from <table_name>_LT such that the deleted flag field of the row is 'N' and one of the following holds:

The row is tagged with version v.

The row is tagged with a version v' that is at a higher level in the hierarchy than v AND the child version field of the row does not contain a version that is between v' and v in the hierarchy.

To make the result 513 corresponding to pessimistic version 403(1), the database system returns a result which includes all rows of emp_table 518 which correspond to rows of emp_table_LT 501 for which the deleted flag is 'N' and one of the following holds:

The row is tagged with version 1

The row is tagged with version 0 and the child version field of the row does not contain the version 1.

The results for the other versions 521 and 523 are produced in the same fashion.

As shown at 515, in addition to emp_table view 518, the versioned relational database system includes auxiliary views 517 for showing conflicting rows on a merge operation, for showing locked rows, for showing differences between two versions, and for simultaneously showing data for multiple versions. The versioned relational database system also includes INSTEAD_OF triggers 519 for transforming insert, update, and delete operations on view 518 into operations on the proper rows of the tables used to generate the query results for the various versions.

Figure 7:
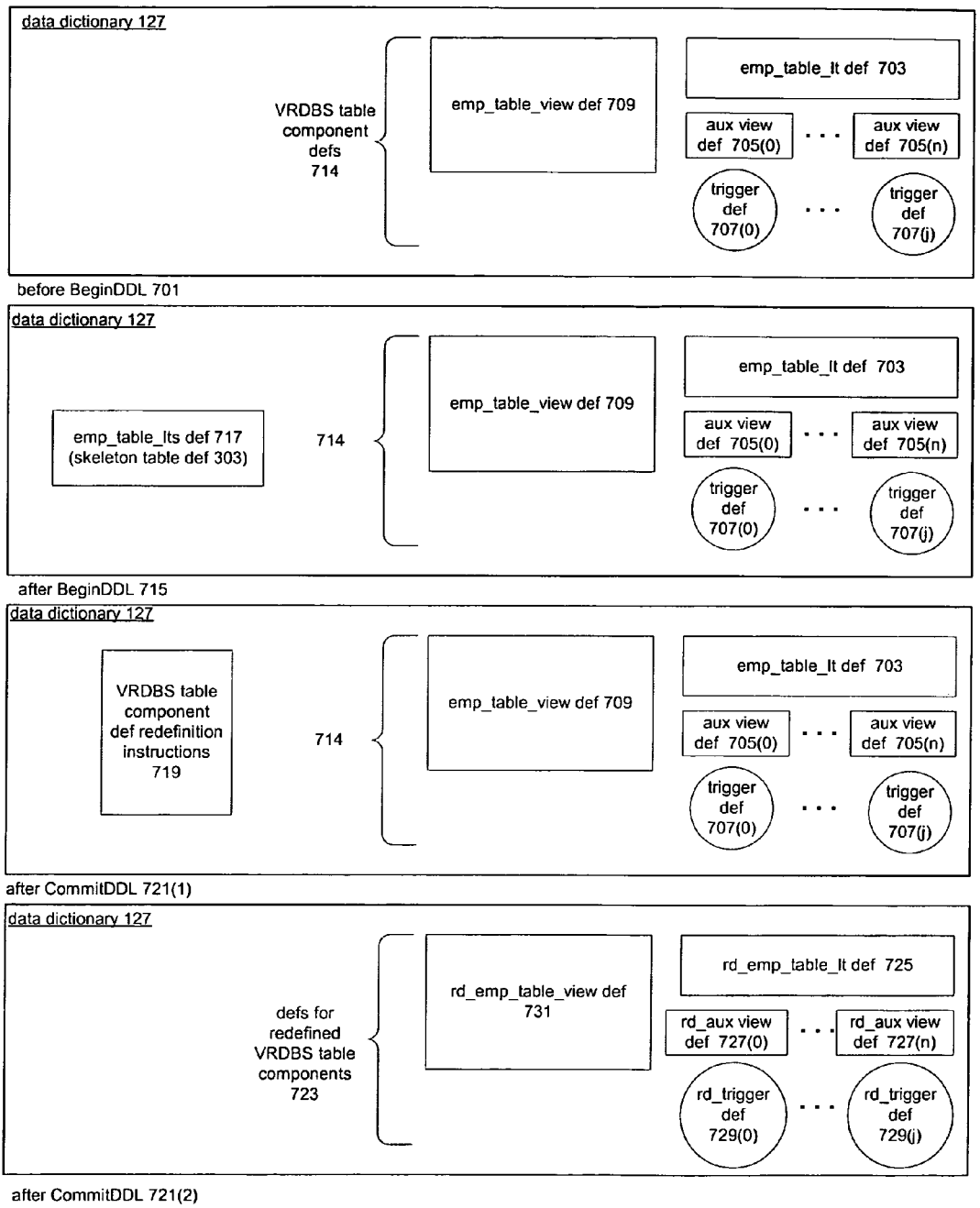
FIG. 7 shows the results of execution of the commands of FIG. 6.

Performing DDL Operations in a Versioned Relational Database System: FIGS. 6 and 7

The following discussion will show how DDL operations may be performed in the versioned relational database system of the Oracle Workspace Manager by means of an example in which a new column, email_address, is added to emp_table LT 501. The instructions which the user provides to the database system to specify the DDL operations are shown in FIG. 6; FIG. 7 shows the effect of the DDL operations on the definitions in data dictionary 127 for emp_table_LT 501 and its associated auxiliary views 517, triggers 519, and emp_table view 518.

Beginning with instructions 601 of FIG. 6, line 603 makes a base table in database system 101 into a table with version information 502. The new table has the name <base table name>_lt. Thus, emp_table 403 when redefined with version information 502 becomes emp_table_LT 501. emp_table is redefined as a view 518 over emp_table_LT 501. The view shows only those columns of emp_table_LT which also belonged to emp_table 403, i.e., those columns of emp_table_LT 501 that do not belong to version information 502. Once emp_table_lt 501 and the view emp_table 518 have been produced, a user may make workspaces 410 as shown at 605. Navigation among workspaces is done with the instruction shown at 607. When a user is in a workspace 410, the user may employ SQL DML commands to read and modify the views in the workspace, as shown by the DML DELETE statement at 608.

To perform a DDL operation on a versioned table, one uses the BeginDDL instruction shown at 609; At 701 in FIG. 7 is shown the condition of the definitions 714 for the versioned table emp_table_LT and related objects in data dictionary 127 prior to execution of the BeginDDL instruction. There are definitions for emp_table_LT 501 and for each of the view and trigger objects related to that table.

The result of the BeginDDL instruction is the creation of skeleton table definition 303 and skeleton table 333 by skeleton table maker component 311 of RDB program 109. Skeleton table maker 311 makes skeleton table definition 717 using the definition 709 of emp_table view 518 in data dictionary 127 as shown at 715 in FIG. 7. Skeleton table 333 made from definition 717 has the name <versioned table name>_LTS, or in this case, emp_table_LTS. It contains the columns of emp_table view 518, i.e., the columns of emp_table_LT which do not belong to version information 502. The constraints, indexes, and triggers that exist on emp_table 518 are also transferred to skeleton table 333.

Once skeleton table definition 717 and the skeleton table 333 made therefrom are available, the user may write a sequence of DDL statements which specify a redefinition of skeleton table 333. The result of the redefinition is changes in skeleton table definition 717. In the example, the DDL statement adds a column, email_address, to skeleton table 333. Up to this point, nothing has been done which changes either VRDBS table component definitions 714 or the components of versioned table 501, and consequently, versioned table 501 and its views have been available to users.

To actually apply the changes specified in DDL statement 611, the user employs the CommitDDL instruction shown at 613. The result of this instruction is to change emp_table_LT def 703 and emp_table_LT 501 itself so that emp_table_LT 501 now contains the column email_address and to change all of the other definitions of components of versioned table 501 and the components themselves as required by the addition of the column. The change is done by transformer component 317 of RDB program 109.

In a presently-preferred embodiment, transformer component 317 does the redefinition in two steps: first, as shown at after ComitDDL 721(1), it uses information from skeleton table definition 717 and VRDBS table component definitions 714 to make a table 719 in data dictionary 127 that contains the instructions necessary to redefine the definitions in VDRS component definitions 714. In a preferred embodiment, each instruction is written as a PL/SQL procedure. For details on PL/SQL, see Scott Urman, *Oracle8 PL/SQL*, Oracle Press from McGraw Hill-Osborne, 1998. Once table 719 is made, skeleton table definition 717 and skeleton table 333 are deleted. Then the instructions in table 719 are applied to VRDBS table component definitions 714 to create definitions 723 for the redefined VRDBS components 723. Database system 101 responds to these changes as it does to any changes in data dictionary 127 by changing the redefined tables to agree with their new definitions. This is shown in rd_pessimistic_result 737, the result of the query on the table defined by rd_emp_table_view def 709. The result now includes a new column, email_address 739.

An advantage of the preferred embodiment is that application of instructions 719 is separate from making them. Until instructions 719 are executed, they are stored in persistent storage 123. Since it is only the application of the instructions which affects component definitions 714, the separation of the time of application of the instructions from the time of making them means that in some embodiments, stage 721(2) of the commit operation can be delayed until a time when the database system is not otherwise being used. An advantage of the fact that the instructions are stored in persistent storage is that the system can gracefully recover from difficulties in processor 121 during the execution of the instructions.

It should also be pointed out here that a graphical user interface may be used to make and modify the skeleton table in place of the instructions of FIG. 6. In such a graphical user interface, the user would be presented with a display of an empty table that had the form of the skeleton table and would then redefine the skeleton table by changing its form in the graphical user interface. The changes would be interpreted either directly by the transformer or would be interpreted to produce DDL, which would then be interpreted by the transformer.

Details of Instructions 719

The DDL operations a user may specify following BeginDDL on the skeleton table in a preferred embodiment are the following:

columns: adding or dropping a column from the skeleton table, modifying the default value, and changing the data type of a column which has either no fields or in which all of fields have null values;

indexes: creating or dropping an index from the skeleton table, triggers: creating, dropping, and enabling and disabling a trigger;

constraints: adding, dropping, enabling, or disabling a constraint.

With each of these operations, transformer 317 must produce instructions that cause the change specified for the skeleton table to occur in each of the definitions in component definitions 714 to which the change made in the skeleton table is relevant. Details follow for each of the operations.

Columns

Each add/drop column operation on the skeleton table is translated into one or more add/drop column operations on base tables underlying the VRDBS. The INSTEAD_OF triggers implementing data manipulation on the VRDBS are modified to reflect the changes in the base tables underlying the VRDBS. Similarly, the definitions of the views of the base tables are altered to reflect the changes in the base tables.

Indexes

Each new index for the skeleton table is translated into a set of indexes on the base tables underlying the VRDBS. The transformed indexes may include one or more columns of version information 502.

User-Defined Triggers

When a table is version-enabled (to transform it to a VRDBS), existing triggers associated with the version-enabled table are invoked from INSTEAD_OF triggers defined on the view from which the workspace views are generated dynamically. The view has three INSTEAD_OF triggers defined for it—one for update, one for insert, and one for delete. The modified triggers which replace the existing triggers are invoked from the INSTEAD_OF triggers using wrapper procedures. Consequently, when a DDL operation redefines a trigger in the skeleton table, transformer 317 must make corresponding wrapper procedures to be invoked from the INSTEAD_OF triggers for the views. This is done as shown in FIG. 8. At 801 is shown an update trigger as it is defined in the DDL that redefines the skeleton table. The trigger is executed whenever table T is updated, before the actual update is done. The trigger compares the old value of column 1 with the new value of column 1 and if the new value is more than 100 more than the old value, the trigger executes a procedure and sets the new value to the old value plus 100.

VRDBS Trigger 801 is of course specific to the skeleton table. Transformer 317 defines a wrapper procedure for each trigger and invokes it from the INSTEAD_OF trigger for the view as shown at 803. The invocation of the wrapper procedure takes the new and old values of the columns (returned by new and old functions) as arguments. The wrapper procedure itself is shown at 805; it simply takes the values and performs the operation that was specified in the original trigger on them.

User-Defined Constraints

User-defined constraints are handled in the same way as the triggers. For each constraint that is added to the skeleton table, transformer 317 generates a procedure that implements the logic for enforcing the constraint. The procedure is then invoked from the procedures that implement data manipulation on the VRDBS.

Example of the PL/SQL Generated by Transformer 317: FIGS. 9–12

FIGS. 9–12 show the PL/SQL that the preferred embodiment generates to implement the changes in emp_table and its related objects that are made in the example of FIG. 6. The DDL in that example adds the column email_address to the skeleton table emp_table_LTS. The PL/SQL produced and executed by transformer 317 in response to this redefinition of the skeleton table redefines emp_table_LT to include the column email_address and redefines all of the objects related to emp_table_LT to bring them into conformity with the redefinition of emp table_LT.

FIG. 9 shows the first part 901 of the PL/SQL. The procedures drop emp_table and its related objects, as shown at 903 and then add the new column to emp_table_LT (905). FIG. 10 shows at 1001 how the wrapper procedures for any user-defined triggers are updated to include the new column. A wrapper procedure as it existed prior to the addition of the column is shown at 1003; the new wrapper procedure generated by transformer 317 is shown at 1005; as can be seen at 1007, the difference is that the new wrapper procedure now has arguments for the new column.

FIG. 11 shows the part of the PL/SQL which creates the altered tables; the new tables correspond of course to the ones shown in FIG. 9. As is shown at 1103, the tables are views and are therefore specified by queries on emp_table_LT. FIG. 12, finally, shows the altered INSTEAD OF triggers at 1201. The INSTEAD OF triggers as altered invoke the wrapper procedures that have been altered as shown in FIG. 10. The INSTEADOF_UPDATE trigger shown at 1203 is typical. It is executed when a user attempts to update emp_table (1207). As shown at 1209, the wrapper procedures are executed for each row.

CONCLUSION

The foregoing Detailed description has disclosed to those skilled in the relevant technologies how the inventors' general technique for redefining a given table that belongs to a group of related objects in a relational database system can be used to redefine a view in a versioned database system from which the database system's versions are derived. The Detailed description has further disclosed the best mode presently known to the inventors of implementing the technique in a versioned relational database system. However, as set forth in the Detailed description, the technique can be used wherever it is advantageous to specify a redefinition of a given table in a group of objects and then have the other objects be automatically redefined so that they are in conformity with the redefined given table. By making the given table a base table that has the same form as a view, the technique can be used in any circumstance where it would be advantageous to apply DDL to a view. It can also be used with GUIs for redefining the given table.

Details of the implementation of the technique disclosed herein are of course determined by the use of the technique with a versioned database system and in a relational database system built by Oracle Corporation. Other uses of the technique and other environments will have implementation details that are determined by those uses and techniques.

Because the technique is so general in its application and the details are determined by the particular application and environment, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. Apparatus for redefining objects belonging to a group of related objects in a relational database system, the group of related objects including a table that is not a base table, the related objects having definitions in the database system, and the apparatus comprising:
    a base table definition maker that receives the definition for the table that is not a base table and makes a base table definition and a base table therefrom;
    a table redefiner that receives input redefining the base table and produces a redefined table definition in response thereto; and
    a transformer that responds to the redefined table definition and to the definitions for objects in the group of related objects to automatically redefine the definitions as required to bring the objects in the group into conformity with the base table as redefined by the input.

2. The apparatus set forth in claim 1 wherein:
    the input redefining the base table is a statement in a data definition language.

3. The apparatus set forth in claim 2 wherein:
the data definition language is the SQL DDL language.

4. The apparatus set forth in claim 1 wherein:
the apparatus includes a graphical user interface for redefining the base table; and
the input redefining the given table is received from the graphical user interface.

5. The apparatus set forth in claim 1 wherein:
the table whose definition is received by the base table definition maker is a view.

6. The apparatus set forth in claim 5 wherein:
the base table has substantially the same form as the view.

7. The apparatus for redefining objects set forth in claim 1 wherein:
the table that is not a base table is a view; and
the table redefiner is an SQL parser that applies a DDL statement to the base table definition made from the view to produce a redefined definition therefor.

8. A method for redefining objects belonging to a group of related objects in a relational database system, the group of related objects including a table that is not a base table, the related objects having definitions in the database system, and the method comprising the steps of:
making a base table and a definition therefor from the table that is not a base table;
receiving input in the relational database system that redefines the base table;
responding to the input in the relational database system by producing a redefined table definition for the base table; and
responding to the redefined table definition and to the definitions for objects in the group of related objects in the relational database system by automatically redefining the definitions as required to bring the objects in the group into conformity with the base table as redefined by the input.

9. The method set forth in claim 7 wherein:
the input redefining the base table is a statement in a data definition language.

10. The method set forth in claim 8 wherein:
the data definition language is the SQL DDL language.

11. The method set forth in claim 7 wherein:
the relational database system includes a graphical user interface for redefining the base table; and
in the step of providing input, the input is provided using the graphical user interface.

12. The method set forth in claim 7 wherein:
the table from whose definition the base table and the definition therefor are made is a view.

13. The method set forth in claim 11 wherein:
the base table has substantially the same form as the view.

14. The method of redefining objects set forth in claim 8 wherein:
the table that is not a base table is a view;
in the step of receiving input, the input is a DDL statement; and
in the step of responding to the input, the redefined table definition for the base table is produced by applying the DDL statement to the base table definition made form the view.

15. A data storage device that is readable by a processor, the storage device being characterized in that:
the storage device contains data representing a program which, when executed by the processor, performs the method set forth in claim 14.

16. A data storage device that is readable by a processor, the storage device being characterized in that:
the storage device contains data representing a program which, when executed by the processor, performs a method for redefining objects belonging to a group of related objects in a relational database system, the group of related objects including a table that is not a base table, the related objects having definitions in the database system, and the method comprising the steps of:
making a base table and a definition therefor from the definition for the table that is not a base table;
receiving input in the relational database system that redefines the base table;
responding to the input in the relational database system by producing a redefined table definition for the base table; and
responding to the redefined table definition and to the definitions for objects in the group of related objects in the relational database system by automatically redefining the definitions as required to bring the objects in the group into conformity with the base table as redefined by the input.

* * * * *